US012700396B2

(12) United States Patent
Steelberg et al.

(10) Patent No.: US 12,700,396 B2
(45) Date of Patent: Aug. 4, 2026

(54) SYSTEMS AND METHODS FOR AUTOMATED SYNTHETIC VOICE PIPELINES

(71) Applicant: VERITONE, INC., Irvine, CA (US)

(72) Inventors: Chad Edward Steelberg, Newport Beach, CA (US); Ryan Scott Steelberg, Newport Beach, CA (US); Sean Patrick King, Oceanside, CA (US); Corey Denard Hill, Denver, CO (US); Christopher Mark Doe, Mission Viejo, CA (US)

(73) Assignee: VERITONE, INC., Irvine, CA (US)

( * ) Notice: Subject to any disclaimer, the term of this patent is extended or adjusted under 35 U.S.C. 154(b) by 355 days.

(21) Appl. No.: 17/982,351

(22) Filed: Nov. 7, 2022

(65) Prior Publication Data

US 2024/0071365 A1 Feb. 29, 2024

Related U.S. Application Data

(60) Provisional application No. 63/400,738, filed on Aug. 24, 2022.

(51) Int. Cl.
*G10L 13/047* (2013.01)
*G06F 16/683* (2019.01)
(Continued)

(52) U.S. Cl.
CPC .......... *G10L 13/047* (2013.01); *G06F 16/683* (2019.01); *G10L 13/033* (2013.01); *G10L 13/08* (2013.01)

(58) Field of Classification Search
CPC .................................................... G10L 13/047
See application file for complete search history.

(56) References Cited

U.S. PATENT DOCUMENTS 11,785,280 B1 * 10/2023 Dakss .............. H04N 21/43079
725/37
2007/0118378 A1 5/2007 Skuratovsky
(Continued)

FOREIGN PATENT DOCUMENTS

WO WO 2/2023
PCT/US22/49166

OTHER PUBLICATIONS

"AI Voice That Sounds Like the Real Thing" retrieved from https://www.veriverse.com/voice on Feb. 28, 2023.

*Primary Examiner* — Jakieda R Jackson
(74) *Attorney, Agent, or Firm* — ONE LLP

(57) ABSTRACT

Disclosed are example embodiments of systems, method, and devices for generating audio assets. The example method includes receiving an input including at least one of audio, text, video, Java Script Object Notation (JSON), Extensible Markup Language (XML), Really Simple Syndication (RSS). The example method includes receiving configuration inputs including at least one of configure language, gender, and persona. The example method includes preparing for processing based on the at least one of configure language, gender, and persona. The example method includes processing the input based on the configuration inputs, the processing including at least one of transcribing, translating, brand safety, enrichment, generating custom Speech Synthesis Markup Language (SSML), and including generating an audio clip. The example method includes delivering the audio clip.

6 Claims, 6 Drawing Sheets

(51) Int. Cl.
  *G10L 13/033*   (2013.01)
  *G10L 13/08*    (2013.01)

(56)      References Cited

U.S. PATENT DOCUMENTS

| | | | |
|---|---|---|---|
| 2008/0109845 A1* | 5/2008 | Hengel | G06Q 30/02 |
| | | | 725/36 |
| 2011/0184721 A1 | 7/2011 | Subramanian et al. | |
| 2012/0324493 A1* | 12/2012 | Holmdahl | H04N 21/252 |
| | | | 725/86 |
| 2015/0269629 A1* | 9/2015 | Lo | H04L 65/65 |
| | | | 705/14.66 |
| 2016/0330497 A1* | 11/2016 | VanAntwerp | H04N 21/2665 |
| 2016/0352603 A1* | 12/2016 | VanAntwerp | H04L 65/70 |
| 2017/0289597 A1* | 10/2017 | Riedel | H04N 21/2183 |
| 2018/0084527 A1* | 3/2018 | Kaufman | H04W 4/06 |
| 2019/0371314 A1* | 12/2019 | Naughton | G06F 16/3329 |
| 2023/0386475 A1* | 11/2023 | Frenzel | G10L 17/04 |

* cited by examiner

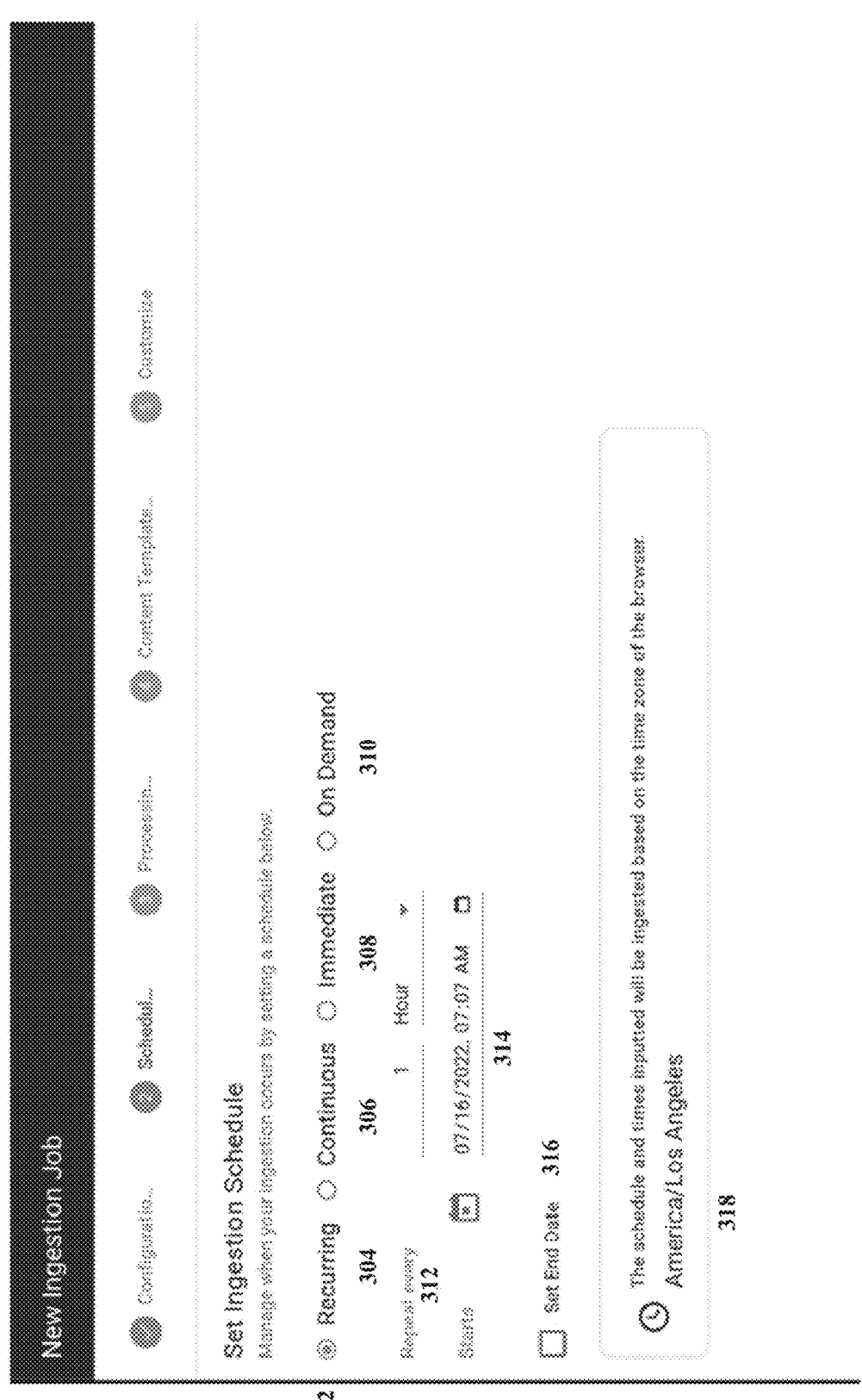
FIG. 3    Scheduler User Interface

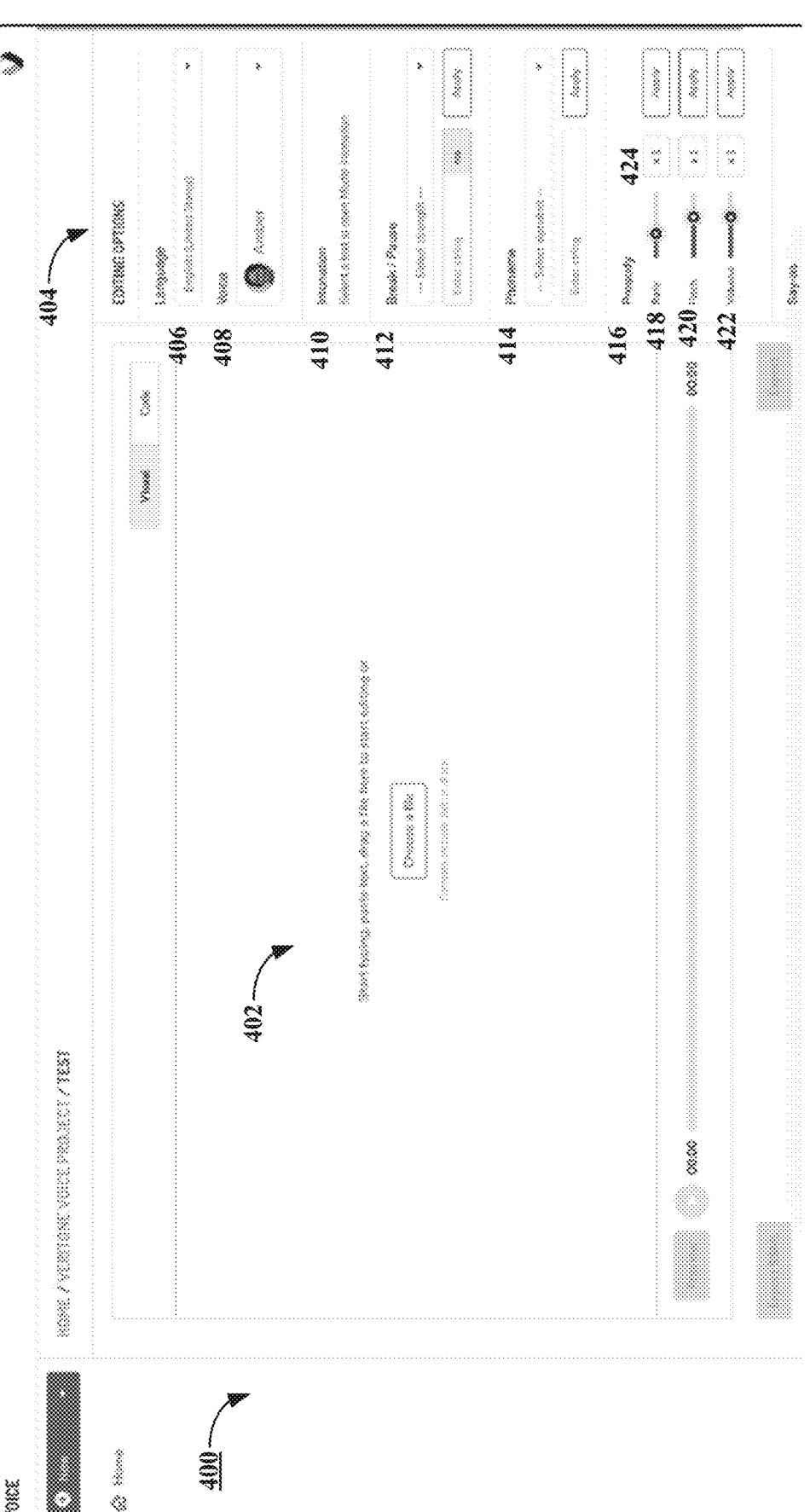
FIG. 4 *Veritone Voice User Interface - TTS Clip Generation*

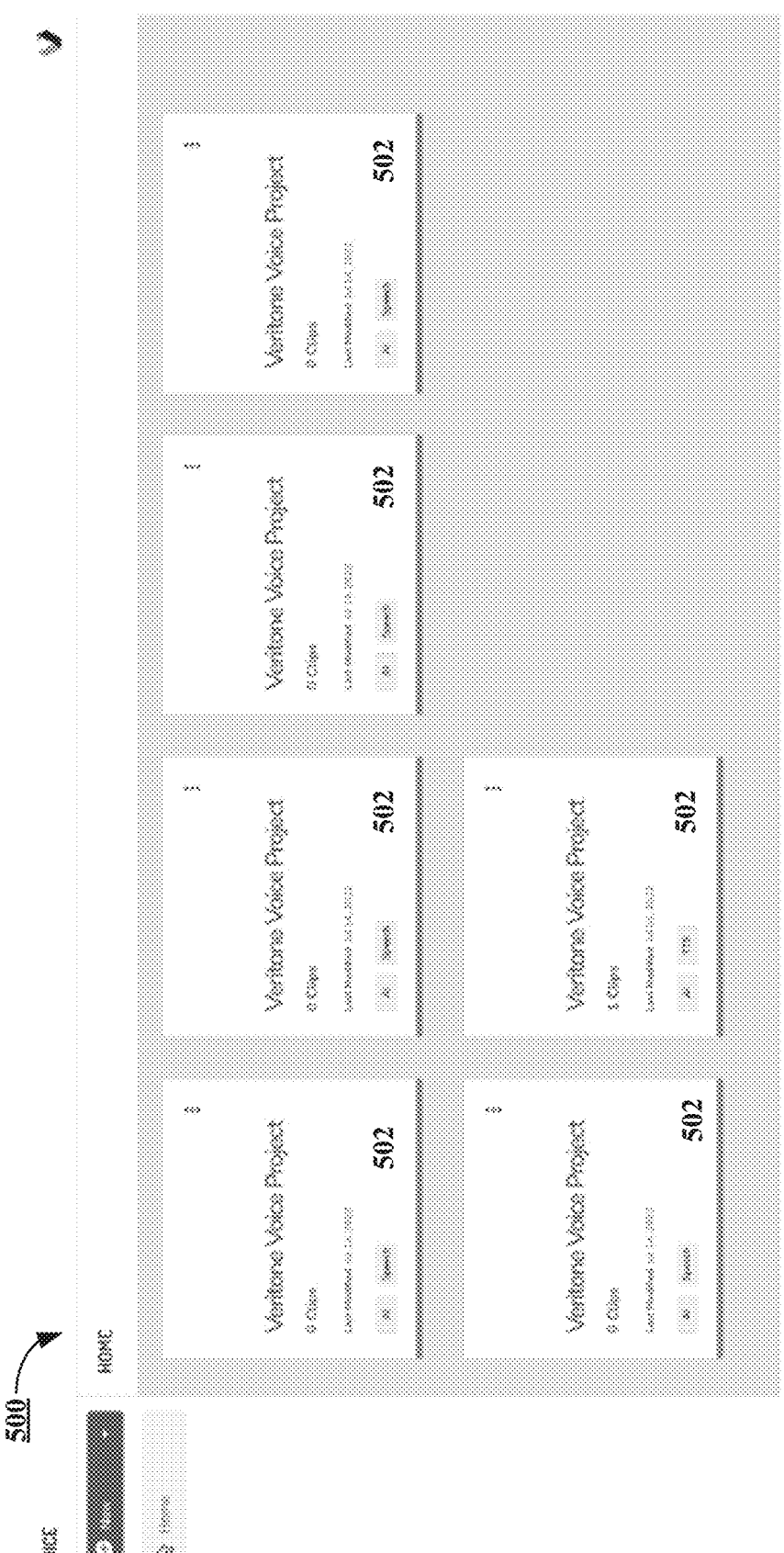
FIG. 5   Veritone Voice User Interface - Projects

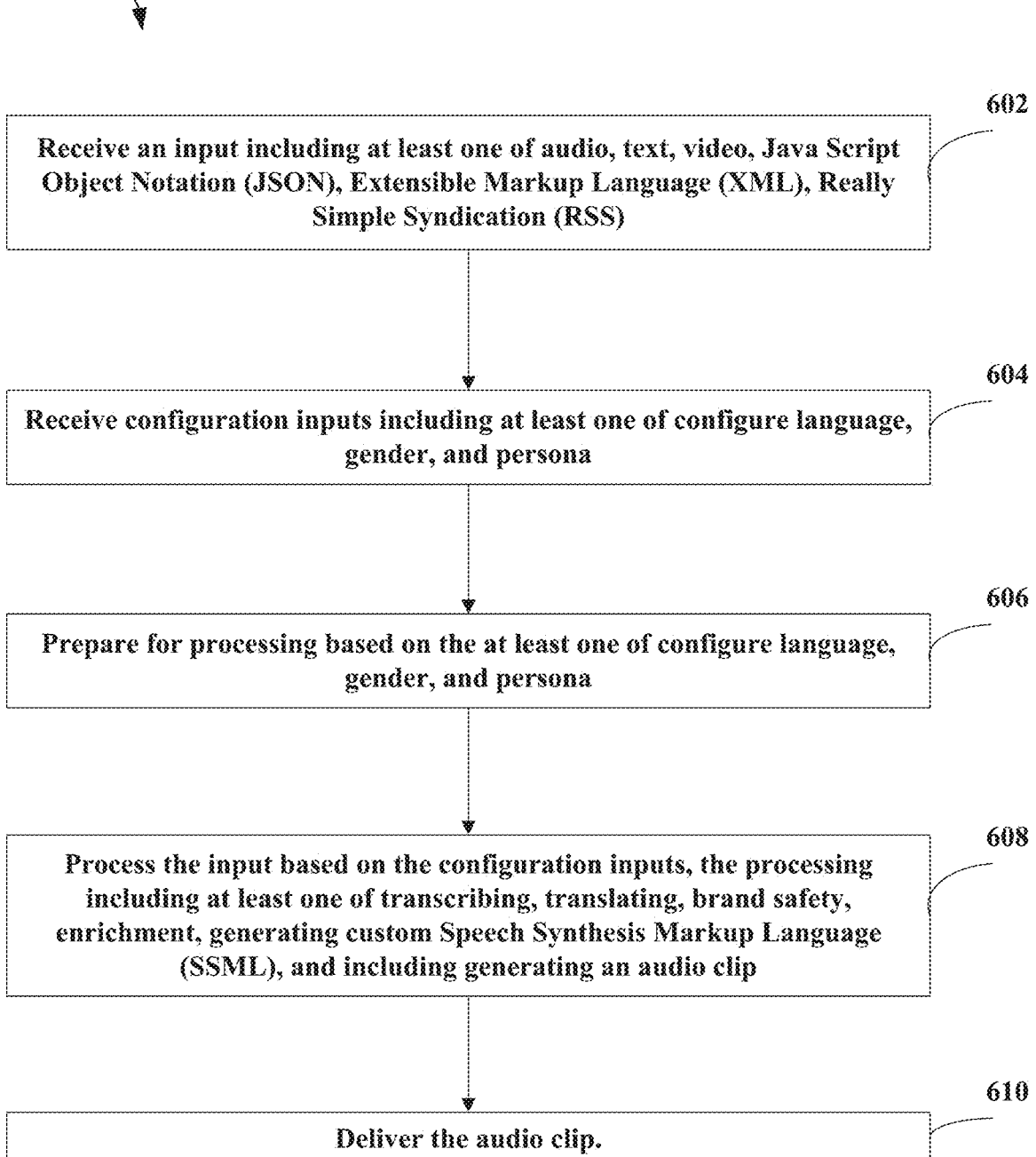

600

602

Receive an input including at least one of audio, text, video, Java Script Object Notation (JSON), Extensible Markup Language (XML), Really Simple Syndication (RSS)

604

Receive configuration inputs including at least one of configure language, gender, and persona

606

Prepare for processing based on the at least one of configure language, gender, and persona

608

Process the input based on the configuration inputs, the processing including at least one of transcribing, translating, brand safety, enrichment, generating custom Speech Synthesis Markup Language (SSML), and including generating an audio clip

610

Deliver the audio clip.

FIG. 6

SYSTEMS AND METHODS FOR AUTOMATED SYNTHETIC VOICE PIPELINES

CLAIM OF PRIORITY UNDER 35 U.S.C. § 119

The present application claims priority to U.S. Provisional Application No. 63/400,738, filed Aug. 24, 2022, and assigned to the assignee hereof and hereby expressly incorporated by reference herein.

TECHNICAL FIELD

The disclosure relates generally to the field of processing audio assets, and specifically and not by way of limitation, some embodiments are related to processing audio assets including synthetic spoken words.

BACKGROUND

Voice driven content work is typically a very time consuming and manual process. Business process wise it is required to orchestrate and schedule various types of talent, vendors and resources which results in a slow to speed to market, high time investment for rereads and mistakes, as well as expense of recurring studio time.

A need exists for an improved way of generating voice driven content.

SUMMARY

In one example implementation, an embodiment includes a system and automated process for generating audio assets that may include synthetic spoken word from various inputs. An example embodiment includes software that may enable content creators to programmatically create spoken word media files by selecting input data to be converted into speech and configuring algorithms to produce customized audio assets.

Disclosed are example embodiments of a method for generating audio assets. The example method includes receiving an input including at least one of audio, text, video, Java Script Object Notation (JSON), Extensible Markup Language (XML), Really Simple Syndication (RSS). The example method includes receiving configuration inputs including at least one of configure language, gender, and persona. The example method includes preparing for processing based on the at least one of configure language, gender, and persona. The example method includes processing the input based on the configuration inputs, the processing including at least one of transcribing, translating, brand safety, enrichment, generating custom Speech Synthesis Markup Language (SSML) and including generating an audio clip. The example method includes delivering the audio clip.

Disclosed are example embodiments of a device for generating audio assets. The device for generating audio assets may include a processor and a memory, coupled to the processor. The memory includes instructions that when executed by the processor, cause the processor to process a received an input including at least one of audio, text, video, Java Script Object Notation (JSON), Extensible Markup Language (XML), Really Simple Syndication (RSS). The memory includes instructions that when executed by the processor, cause the processor to process a received configuration inputs including at least one of configure language, gender, and persona. The memory includes instructions that when executed by the processor, cause the processor to prepare for processing based on the at least one of configure language, gender, and persona. The memory includes instructions that when executed by the processor, cause the processor to process the input based on the configuration inputs, the processing including at least one of transcribing, translating, brand safety, enrichment, generating custom Speech Synthesis Markup Language (SSML), and including generating an audio clip. The memory includes instructions that when executed by the processor, cause the processor to deliver the audio clip.

The features and advantages described in the specification are not all-inclusive. In particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the disclosed subject matter.

BRIEF DESCRIPTION OF THE DRAWINGS

The foregoing summary, as well as the following detailed description, is better understood when read in conjunction with the accompanying drawings. The accompanying drawings, which are incorporated herein and form part of the specification, illustrate a plurality of embodiments and, together with the description, further serve to explain the principles involved and to enable a person skilled in the relevant art(s) to make and use the disclosed technologies.

FIG. 3 is a diagram illustrating a scheduler user interface in accordance with the systems and methods described herein.

FIG. 4 is a diagram illustrating an example voice user interface in accordance with the systems and methods described herein.

FIG. 5 is a diagram illustrating another example voice user interface in accordance with the systems and methods described herein.

FIG. 6 is a flow diagram illustrating an example method in accordance with the systems and methods described herein.

Figure 1:
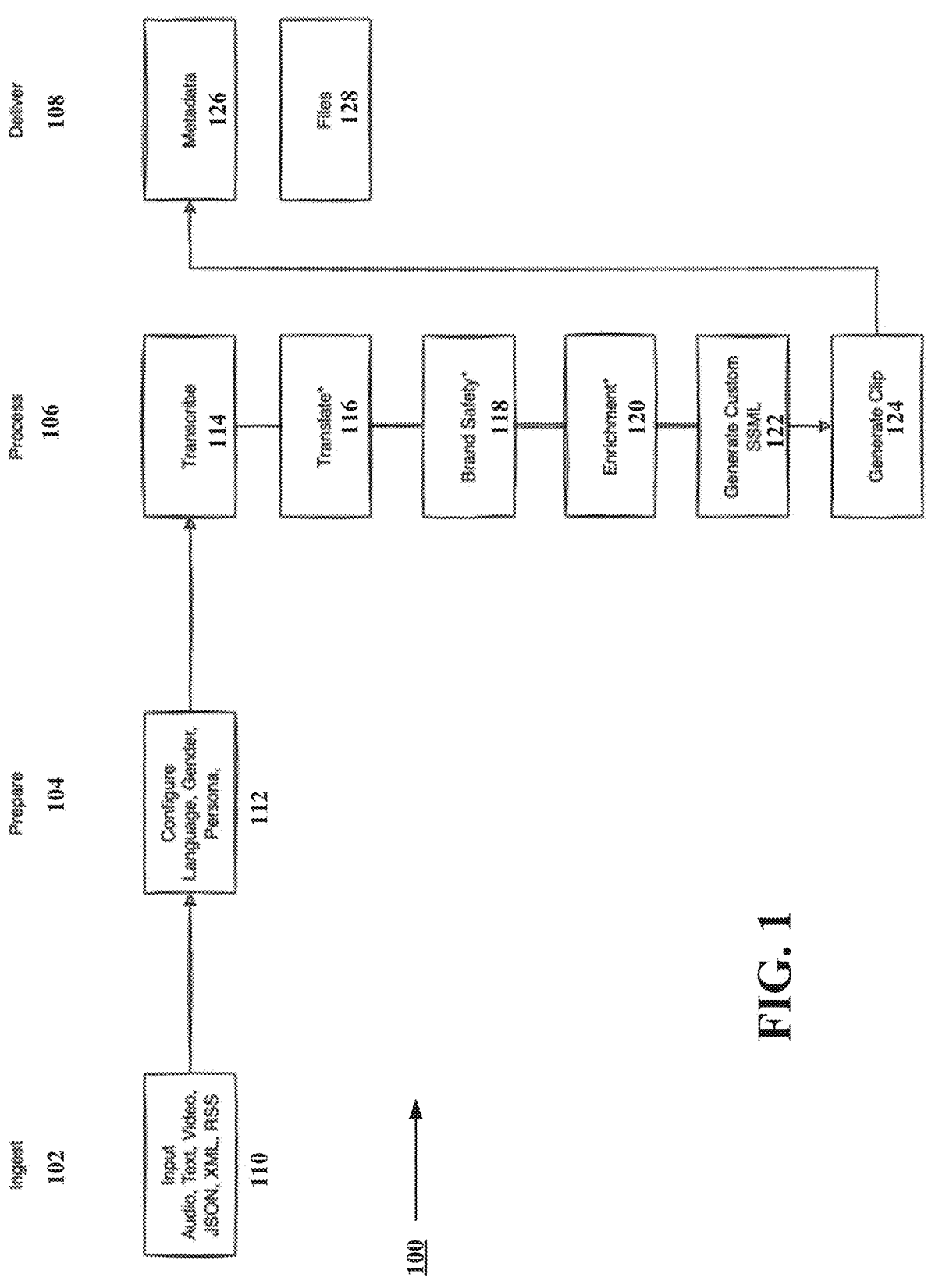
FIG. 1 is an example flowchart of a method in accordance with the systems and methods described herein.

The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

DETAILED DESCRIPTION

The detailed description set forth below in connection with the appended drawings is intended as a description of configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The systems and methods described herein provide for automated synthetic voice pipelines (ASVPs). Some embodiments include a system and automated process for generating audio assets that may include synthetic spoken word from various inputs. An example embodiment includes software that may enable content creators to programmatically create spoken word media files by selecting input data to be converted into speech and configuring algorithms to produce customized audio assets.

Disclosed are example embodiments of a method for generating audio assets. The example method includes receiving an input including at least one of audio, text, video, Java Script Object Notation (JSON), Extensible Markup Language (XML), Really Simple Syndication (RSS). The example method includes receiving configuration inputs including at least one of configure language, gender, and persona. The example method includes preparing for processing based configurable low-level inputs such as language, gender, and persona or more high-level outcomes such as business objectives or restraints. The example method includes processing the input based on the configuration inputs, the processing including a such as transcribing, translating, brand safety, enrichment, generating custom Speech Synthesis Markup Language (SSML) as well generating Natural Language Processing (NLP) driven content from metadata, and including generating an audio clip. The resulting audio clip can also have post-production Digital Signal Processing (DSP) effects applied as a function of the pipeline to ensure alignment with required outcomes. While the example method includes one concept of delivering the audio clip, the extensible nature of the platform enables delivery to any system or service that can support the available output data.

In an example embodiment, resulting audio assets may be rendered by computer generated or human replicated voice models across various genders, languages, and combined personas. Users may also choose to apply additional models such as brand safety, contextual lexicon boosting and conversational enrichment to ensure the proper asset is created.

An example embodiment may enable content producers to get the content producers' content to market quicker. For example, an example embodiment may reduce the need for live, in-studio talent recordings. An example embodiment may break down language barriers by producing audio assets that are translated variations, e.g., of input textual data. An example embodiment may ensure brand suitability and make the content more conversational and with fewer human steps enabling significant scale in operations without loss in quality.

As discussed above, voice driven content work is typically a very time consuming and manual process. Business process wise, previous voice driven content work may require orchestration and scheduling various types of talent, vendors, and resources. Such orchestration and scheduling may result in a slow speed to market, high time investment for rereads, and mistakes. Such orchestration and scheduling may also result in expenses of recurring studio time.

Synthetic voice may also enable voice talent to scale the use of the voice talent's voice by driving content through a voice model cloning algorithm, effectively removing the need for recurring in studio recordings or participation in live broadcasting events. Fans may now experience the fan's favorite events and engagements in a familiar voice, even when these events are concurrently scheduled or in multiple languages.

In an example embodiment, the automated synthetic voice pipeline may recreate the business and voice creation processes in a computer-based web service. Users may select various languages and personas to personalize the user's engagement as the user sees fit. Similar approaches may apply to other sports, traffic, weather, and real-time avatar/metaverse content where customizable, dynamic and engaging content needs to be driven through human voice. Adthos' creative suite is a similar service that is focused on the advertising creative industry.

An example message count for an example 459 game season may be approximately 3 million messages. One or more of these messages may be processed to generate a computerized voice. The messages generated in the computerized voice may have various variability and resiliency features. In the example embodiment three voice choices may be provided. Three language choices may be provided, and various backup services may be provided. For example, a text message in English may be translated to a voice message in English, Spanish, French, or any other language where computerized translation is appropriate. Backup services to enable disaster recovery options that ensure service availability. Service/endpoints may include parsing, brand safety, or content moderation algorithms that may ensure that the content produced by the pipeline aligns with brand and/or legal compliance requirements. The algorithms may create Synthetic Speech Markup Language (SSML) and Natural Language Processing (NLP) generated content that may produce configurable enhancements such as, but not limited to, intonation, metadata derived dialogue, and pronunciation modifications prior the audio being produced or prior to creating a clip. The algorithms may also apply post-production modifications through the application of 'DSP effects at scale through configurable settings to modify the sound attributes of the clip and store the clips. Metadata delivery may relate to responses.

In an example embodiment, most of the services in the Service/Endpoints section may include interchangeable algorithms/models selected by business need. The overarching service may use a play-by-play sports feed (External). In the play-by-play sports feed, service may provide a message-based stream of play-by-play events, insights and/or statistics to be converted to a synthetic voice, e.g., a computer-generated voice.

In an example embodiment, a transcription model may be used. In an example embodiment, a transcription model (optional—External or Internal) may be used. For example, service may provide the ability to take an audio file of spoken words and generate the text from the audio for downstream use.

In an example embodiment, a brand safety and or content moderation model may be used, e.g., optional—External or internal). Service may apply content moderation to determine age and brand suitability by identifying sensitive or adult topics and understanding the context/saturation of these categories of content.

An example embodiment may use a lexicon model. With the lexicon model, service may enable user defined dictionaries to ensure specific words are pronounced correctly by the synthetic voice model. This would include things like player, team, and stadium names, and soccer terminology. In an example embodiment, PK=Penalty Kick. Other sports specific acronyms and terms may also be used in conjunction with the systems and methods described herein. For example, within the area of American football, "QB" might be used to indicate the quarterback. (The quarterback is one of generally 11 players on the offense of an American football team playing American football.)

An example of the systems and methods described herein may include a voice. The example may provide Text to Speech (TTS) and Speech to Speech (STS) services necessary to the pipeline for generating Synthetic Speech Markup Language (SSML) as well as managing and producing synthetic voice content assets.

An example embodiment may include a front-end software. The software that controls the head movement, may for example, include: an ASVP Scheduler that may be a front-end SW that has been developed to schedule "ingestion jobs" across any data source. Scheduled jobs may then be executed by the Listener based on user-defined schedules.

The software that controls the head movement, may for example, include: an ASVP Listener and an ASVP Processor. These may be proprietary software to manage the real time data orchestration listening for requests from external services or the internal scheduler to initialize resources needed to process the job.

An example embodiment may include a synthesis application programming interface (API) that may be used to allow real-time orchestration of the combined services needed within the automated synthetic voice pipeline.

An example embodiment may use a voice text-to-speech (TTS) model. Voice may be proprietary front-end SW that allows users to create synthetic audio clips in both TTS and STS input functions. https://www.veriverse.com/voice.html. Generally, this is a fully automated process between servers.

FIG. 1 is an example flowchart of a method 100 in accordance with the systems and methods described herein. The illustrated example includes a series of four functional subsets of functions. The four functional subsets include "ingest" 102, "prepare" 104, "process" 106, and "deliver" 108. Ingest 102 may also be referred to as input.

As illustrated in FIG. 1, Ingest 102 may include inputs 110 that may include, but are not limited to, audio, text, video, Java Script Object Notation (JSON), Extensible Markup Language (XML), Really Simple Syndication (RSS), or other appropriate computer inputs. Each of these may be performed in an example system in accordance with the systems and methods described herein. As illustrated in FIG. 1, Prepare 104 may include configure language and gender, persona, e.g., for the processing of an ingested input such as audio, text, video, Java Script Object Notation (JSON), Extensible Markup Language (XML), Really Simple Syndication (RSS), or other appropriate computer inputs 112.

As illustrated in FIG. 1, Process 106 may include, but is not limited to one or more of transcribe 114, translate 116, brand safety 118, enrichment 120, generate custom speech synthesis markup language (SSML) 122, and generate clip 124. As illustrated in FIG. 1, Deliver 108 may include, but is not limited to one or more of the delivery of metadata 126, files 128, or both metadata 126 and files 128.

Accordingly, in an example embodiment, of a system as illustrated in FIG. 1 may ingest and input such as audio, text, video, Java Script Object Notation (JSON), Extensible Markup Language (XML), Really Simple Syndication (RSS), or other appropriate computer inputs. The system may be configured as to language, gender, and or persona. The configuration may control the further processing of the inputs (e.g., audio, text, video, Java Script Object Notation (JSON), Extensible Markup Language (XML), Really Simple Syndication (RSS), or other appropriate computer inputs) during the one or more of the process steps. For example, the language selected in the prepare step may impact the translate sub-step of the process step. Accordingly, the inputs may then be transcribed or translated. In an example, a brand safety or content moderation algorithm may be used that ensure the content produced by the pipeline aligns with brand and/or legal compliance requirements. In some examples, enrichment of the audio and/or a custom Speech Synthesis Markup Language (SSML) may be generated. In an example clip generation may occur.

Figure 2:
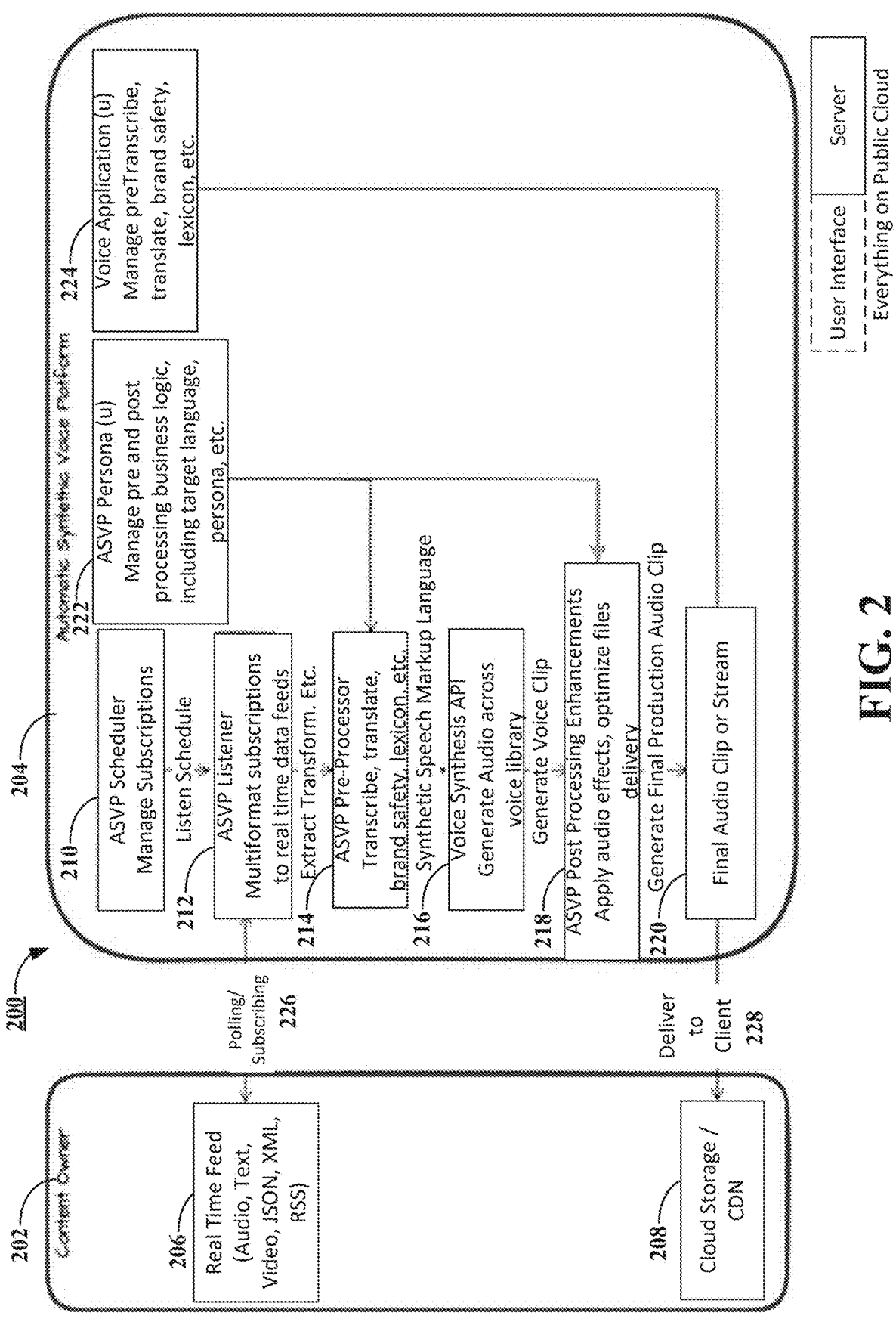
FIG. 2 is a block diagram illustrating an example system in accordance with the systems and methods described herein.

FIG. 2 is a block diagram 200 illustrating an example system in accordance with the systems and methods described herein. The illustrated example of FIG. 2 may generally be broken up into two parts. The first part is a block "content owner" 202. The second part is a block, "Automatic Synthetic Voice Platform" 204. The content owner block 202 may include a real time data feed 206 as well as cloud storage/content delivery network (CDN) 208. The Automatic Synthetic Voice Platform block 204 may include an ASVP scheduler 210, an ASVP listener 212, an ASVP Pre-processor 214, a voice synthesis API 216, ASVP post processing enhancements 218, a final audio clip or stream block 220, an ASVP persona block 222, and a voice application block 224. As illustrated in the example the real time data feed 206 in the content owner block 202 and the ASVP listener block 212 in the voice platform 204 maybe in communication with each other. For example, the communication between the real time data feed in the content owner block and the ASVP listener block in the voice platform may include polling/subscribing 226. The polling/subscribing 226 may, in some examples, be a bidirectional communication. In other words, the real time data feed block 206 in the content owner block 202 may send and receive information to and from the ASVP listener block 212 in the voice platform block 204 and the ASVP listener block 212 in the voice platform block 204 may also send and receive information to and from the real time data feed block 206 in the content owner block 204. Additionally, the cloud storage/ CDN block 208 may receive client data 228 from the final file block 220 within the voice platform 204. Accordingly, the final file block 220 within the voice platform block 204 may transmit the client data 228 to the cloud storage/CDN block 208.

The ASVP scheduler block may communicate a schedule to the ASVP listener. The ASVP listener may extract or transform information received such as polling/subscribing data and/or schedule data. The extracted and/or transformed information may be provided to the ASVP pre-processor which may generate a synthetic speech markup language to the voice synthesis API, which may generate a clip. The clip may be provided to the synthesis API which made generate a final file that may be delivered to a client, for example, at cloud storage/CDN. the final file may also be placed in a client account and provided to a voice block. The voice block may allow a user to listen to the final file.

FIG. 3 is a diagram illustrating a scheduler user interface 300 in accordance with the systems and methods described herein. The scheduler user interface 300 may include a series of inputs 302 including recurring 304, continuous 306, immediate 308, and on-demand 310. In the illustrated example of FIG. 3 recurring 304 is selected. Accordingly, the user may input a repeat value 312 such as every one hour as illustrated in the figure. It will be understood however, that other periods of time may be selected. For example, with the selection of hour, any number of hours may be selected. However, the selection for "hour" is selectable. In some examples, the time period may be in seconds, minutes, hours, days, weeks, months, years or any other appropriate length of time. Furthermore, the scheduler user interface allows a user to set an end date 316. additionally, a start time may be selected 314. For example, in the illustrated example of the figure Jul. 16, 2022 at 7:07 AM is selected as the start date and time. It will be understood that others start times are also possible. For example, any valid future time that may be entered using a day, month, year, and time, May be appropriate. Furthermore, different embodiments may have different formats for the start time entry. For example, some embodiments may use a United States format for the date, e.g., mm/dd/yyyy, while other embodiments may use a European format for the date, dd/mm/yyyy. It will be understood that these are only intended to be possible examples. Accordingly, jobs may be selected as "recurring," e.g., every hour, and starting at a particular time. Additionally, a time zone may be selected 318 so that the start time may be correctly generated.

FIG. 4 is a diagram illustrating an example voice user interface 400 in accordance with the systems and methods described herein. The figure illustrates a voice user interface 400 for a TTS clip generation. In an example a user may start typing, paste text, drag a file or otherwise provide an input in the input space 402. The input may be turned into a voice file. In the illustrated example no input file has been generated yet. Accordingly, the voice file has no length, e.g., 00:00. As illustrated in the figure, the voice user interface for TTS clip generation may include a variety of options 404 such as language 406, voice 408, intonation 410, break slash pause 412, and phoneme 414. Phoneme 414 may be defined as any of the perceptually distinct units of sound in a specified language that distinguish one word from another, for example p, b, d, and t in the English words pad, pat, bad, and bat. In the illustrated example, when changes are made under phoneme 414 they must be "applied" before the changes take effect.

The illustrated example also includes inputs for prosody 416. Prosody 416 may be defined as the patterns of rhythm and sound used in poetry. Accordingly, the illustrated example includes inputs for rate, pitch, and volume. Furthermore, those inputs for rate 418, pitch 420, and volume 422 may be multiplied 424. In the current example each is set at "times-one," i.e., "X1." In other words, the rate set by the input bar maybe multiplied by 1. Other settings may include ½, 2, 4, for example. This is not intended to be an exhaustive list. In the illustrated example, when changes are made under prosody they must be "applied" before the changes take effect. Another example input of the voice user interface for TTS clip generation is "Say-as." which enables pronunciation configuration to ensure a group of numbers are represented as a single digit or as a group of individual digits.

FIG. 5 is a diagram illustrating another example voice user interface 500 in accordance with the systems and methods described herein. The figure illustrates an example of a voice user interface 500 for projects. In other words, the example illustrates one way a user may access a number of projects that are being worked on in accordance with the systems and methods described herein. Generally, the interface may be described as a graphical user interface. A number of example voice projects 502 is illustrated in the figure. In some examples, these blocks (e.g., voice projects 502) that correspond to voice projects may be generated on a screen of a computer, terminal, pad, mobile telephone handset, smart phone, or other electronic device that is appropriate for implementing the systems and methods described herein. Each project may indicate a name for the project, a number of clips in the project, a last modified date, as well as indications for things like AI, speech, TTS, or other attributes of the particular project. The systems and methods described herein may allow a user to generate a new project and may include a graphical interface allowing the selection of a "home" screen. when the home screen is selected, the electronic device implementing the systems and methods described herein may cause a screen having a number of projects to be displayed to a user.

FIG. 6 is a flow diagram illustrating an example method 600 in accordance with the systems and methods described herein. The method 600 is a method of generating audio assets. The method 600 includes receiving an input including at least one of audio, text, video, Java Script Object Notation (JSON), Extensible Markup Language (XML), Really Simple Syndication (RSS) (602). The method 600 also includes receiving configuration inputs including at least one of configure language, gender, and persona (604). Additionally, the method 600 includes preparing for processing based on the at least one of configure language, gender, and persona (606). The method 600 also includes processing the input based on the configuration inputs, the processing including at least one of transcribing, translating, brand safety, enrichment, generating custom Speech Synthesis Markup Language (SSML), and including generating an audio clip (608). Additionally, the method 600 include delivering the audio clip (610).

The method 600 includes receiving an input including at least one of audio, text, video, Java Script Object Notation (JSON), Extensible Markup Language (XML), Really Simple Syndication (RSS) (602). For example, ingest 102 may occur at input 110 of FIG. 1. In another example, real time data 206 may be received at the content owner 202 as illustrated in FIG. 2. In an example, data is received at the data feed and processed as an input to the system.

The method 600 also includes receiving configuration inputs including at least one of configure language, gender, and persona (604). For example, this data may occur at prepare 104 at configure block 112 of FIG. 1.

Additionally, the method 600 includes preparing for processing based on the at least one of configure language, gender, and persona (606). For example, prepare 104 at configure block 112 of FIG. 1 may preparing for processing based on the at least one of configure language, gender, and persona. In an example embodiment, preparing for processing based on the at least one of configure language, gender, and persona (606) may include preparing for processing based on configure language and generating the clip comprises generating the clip in a predetermined language based on the configuration language selected. In an example embodiment, preparing for processing based on the at least one of configure language, gender, and persona (606) may include preparing for processing based on gender and generating the clip comprises generating the clip having a voice corresponding to a selected gender In an example embodiment, preparing for processing based on the at least one of configure language, gender, and persona (606) may include preparing for processing based on persona and generating the clip comprises generating a clip based on a predetermined persona, an aspect of someone's character that is perceived by others, based on the persona selected.

The method 600 also includes processing the input based on the configuration inputs, the processing including at least one of transcribing, translating, brand safety, enrichment, generating custom Speech Synthesis Markup Language (SSML), and including generating an audio clip (608). For example, the processing may include at least one of transcribing 114, translating 116, brand safety 118, enrichment

120, generating custom Speech Synthesis Markup Language (SSML) 122, and including generating an audio clip 124 (608), as illustrated in FIG. 1 under process 106.

The method 600 also includes delivering the audio clip (610). In an example embodiment, delivering the audio clip (610) may include delivering files. For example, delivering the audio clip (610) may include delivery 108 of FIG. 1, e.g., metadata 126 and/or files 128 as illustrated in FIG. 1. In an example embodiment, delivering the audio clip (610) may include further includes delivering metadata. In an example embodiment, delivering the audio clip (610) may include delivering metadata.

One or more elements or aspects or steps, or any portion(s) thereof, from one or more of any of the systems and methods described herein may be combined with one or more elements or aspects or steps, or any portion(s) thereof, from one or more of any of the other systems and methods described herein and combinations thereof, to form one or more additional implementations and/or claims of the present disclosure.

One or more of the components, steps, features, and/or functions illustrated in the figures may be rearranged and/or combined into a single component, block, feature or function or embodied in several components, steps, or functions. Additional elements, components, steps, and/or functions may also be added without departing from the disclosure. The apparatus, devices, and/or components illustrated in the Figures may be configured to perform one or more of the methods, features, or steps described in the Figures. The algorithms described herein may also be efficiently implemented in software and/or embedded in hardware.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the methods used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared or otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following disclosure, it is appreciated that throughout the disclosure terms such as "processing," "computing," "calculating," "determining," "displaying" or the like, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. It will be appreciated that a variety of programming languages may be used to implement the teachings of the invention as described herein.

The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats.

Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming.

Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of generating real-time audio assets for an automated synthetic voice pipeline, the method comprising:
   polling and listening for a textual input in accordance with a schedule for an online broadcast;

receiving configuration inputs including at least one of configure language, gender, and persona;
   preparing for processing based on the at least one of configure language, gender, and persona;
   processing the textual input based on the configuration inputs, the processing including at least one of transcribing, translating, brand safety, enrichment, generating custom Speech Synthesis Markup Language (SSML), and including generating a real-time audio clip; and
   broadcasting the audio clip via the automated synthetic voice pipeline,
   wherein the polling and listening comprises establishing and maintaining a network connection configured for real-time, event-driven polling or subscription to the online broadcast source, and wherein the processing and broadcasting are performed by the synthetic voice generation module to deliver the audio clip for broadcast in real time according to the defined schedule.

2. The method of claim 1, wherein broadcasting the audio clip includes delivering files.

3. The method of claim 1, wherein broadcasting the audio clip further includes delivering metadata.

4. The method of claim 1, wherein preparing for processing based on the at least one of configure language, gender, and persona comprises preparing for processing based on configure language and generating the clip comprises generating the clip in a predetermined language based on the configuration language selected.

5. The method of claim 1, wherein preparing for processing based on the at least one of configure language, gender, and persona comprises preparing for processing based on gender and generating the clip comprises generating the clip having a voice corresponding to a selected gender.

6. The method of claim 1, wherein preparing for processing based on the at least one of configure language, gender, and persona comprises preparing for processing based on persona and generating the clip comprises generating a clip based on a predetermined persona, an aspect of someone's character that is perceived by others, based on the persona selected.

* * * * *